(12) United States Patent
Kwak et al.

(10) Patent No.: US 12,728,928 B2
(45) Date of Patent: Sep. 8, 2026

(54) SAFETY-ENHANCED CENTER PILLAR STRUCTURE FOR A VEHICLE

(71) Applicants: HYUNDAI MOTOR COMPANY, Seoul (KR); KIA CORPORATION, Seoul (KR)

(72) Inventors: Kyung-Tae Kwak, Hwaseong-si (KR); Ji-Won Chang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 260 days.

(21) Appl. No.: 18/733,493

(22) Filed: Jun. 4, 2024

(65) Prior Publication Data

US 2025/0100623 A1 Mar. 27, 2025

(30) Foreign Application Priority Data

Sep. 27, 2023 (KR) ........................ 10-2023-0130263

(51) Int. Cl.
*B62D 25/04* (2006.01)
*B62D 25/02* (2006.01)
*B62D 27/02* (2006.01)
*B60R 22/34* (2006.01)

(52) U.S. Cl.
CPC ........... *B62D 25/04* (2013.01); *B62D 25/025* (2013.01); *B62D 27/023* (2013.01); *B60R 22/34* (2013.01)

(58) Field of Classification Search
CPC ..... B62D 25/025; B62D 25/04; B62D 27/023
USPC ................................ 296/30, 187.12, 193.06
See application file for complete search history.

(56) References Cited

U.S. PATENT DOCUMENTS

| | | | | |
|---|---|---|---|---|
| 7,152,914 | B2 * | 12/2006 | Dingman | B62D 25/04 296/203.03 |
| 8,118,355 | B2 | 2/2012 | Tamura | |
| 8,662,575 | B2 | 3/2014 | Tamura | |
| 9,045,165 | B2 | 6/2015 | Kurokawa | |
| 2008/0231078 | A1 * | 9/2008 | Tomozawa | B62D 25/2036 296/187.05 |
| 2012/0098297 | A1 | 4/2012 | Kurokawa | |
| 2012/0248825 | A1 * | 10/2012 | Tamura | B62D 25/025 296/209 |

FOREIGN PATENT DOCUMENTS

| | | |
|---|---|---|
| CN | 217835573 U | 11/2022 |
| JP | 5472796 B2 | 4/2014 |

(Continued)

*Primary Examiner* — Jason S Daniels
(74) *Attorney, Agent, or Firm* — Lempia Summerfield Katz LLC

(57) ABSTRACT

A safety-enhanced center pillar structure for a vehicle includes: a reinforced outer portion provided on the inner side of a center pillar of the vehicle; a reinforced inner portion provided on the inner side of the vehicle in a manner that is spaced apart from the reinforced outer portion; and a connection member. The connection member is positioned between the reinforced outer portion and the reinforced inner portion and connects the reinforced outer and reinforced inner portions to each other. One portion of the connection member is positioned over an upper horizontal surface of a side sill outer portion. Thus, the connection member creates a predetermined distance together with the upper horizontal surface of the side sill outer portion.

20 Claims, 12 Drawing Sheets

(56) References Cited

FOREIGN PATENT DOCUMENTS

| | | | |
|---|---|---|---|
| JP | 2017197056 | A | 11/2017 |
| KR | 970051616 | U | 9/1997 |
| WO | 2011077808 | A1 | 6/2011 |
| WO | 2011125219 | A1 | 10/2011 |

* cited by examiner

SAFETY-ENHANCED CENTER PILLAR STRUCTURE FOR A VEHICLE

CROSS-REFERENCE TO RELATED APPLICATION

This application claims priority to Korean Patent Application No. 10-2023-0130263, filed on Sep. 27, 2023, which is incorporated herein by reference in its entirety.

BACKGROUND

Field of the Disclosure

The present disclosure relates to a safety-enhanced center pillar structure for a vehicle that is capable of preventing a lower portion of the vehicle, in contact with a side sill, from being pushed into a passenger compartment of the vehicle during a lateral collision.

Description of Related Art

A center pillar 110 is provided to connect a roof 120 and a side sill 130 of a vehicle 100 when viewed from the side of the vehicle 100.

As illustrated in FIG. 1, upper and lower end portions of the center pillar 110 are connected to the roof 120 and the side sill 130, respectively, thereby forming a lateral structure of the vehicle 100.

Particularly, a collision load is applied to connected portions of the center pillar 110 and the side sill 130 when the vehicle 100 experiences a lateral collision. Thus, a stiffer structure is required of the center pillar 110.

As illustrated in FIG. 2, to reinforce the stiffness of the center pillar 110 toward an inner side of the center pillar 110, a reinforced outer portion 121 and a reinforced inner portion 122 are arranged to be spaced apart from each other in a widthwise direction of the vehicle 100. Lower portions of the reinforced outer portion 121 and the reinforced inner portion 122 are joined to each other on an upper horizontal surface of a side sill outer portion 131 of the side sill 130.

Here, there is no structure that firmly supports a space formed between the reinforced outer portion 121 and the reinforced inner portion 122. Thus, a problem arises in that the side sill 130 penetrates into the passenger compartment of the vehicle 100 during the lateral collision.

For example, a cross-sectional structure of the side sill 130 formed by the side sill outer 131 and the side sill inner 132 collapses in a case where a barrier B is caused to hit a lateral side of the vehicle 100 in order to test the vehicle 100 for the lateral collision.

In addition, a lower end portion (L2) of the barrier B is positioned at a greater height than an upper horizontal surface (L1) of the side sill outer 131 (refer to h1 in FIG. 2). Because of this, the connected portions of the center pillar 110 and the side sill 130 are readily crooked, and thus a lower end portion of the center pillar 110 and the side sill 130 are pushed into the passenger compartment.

Accordingly, a problem arises in that the risk of injury to a passenger increases due to a reduced space for survival in the passenger compartment.

SUMMARY

An object of the present disclosure is to address or solve the above-mentioned problems. A safety-enhanced center pillar structure for a vehicle is provided. The structure is capable of supporting, i.e., resisting a lateral collision load at connected portions of a center pillar and a side sill while the vehicle experiences a lateral collision. Thus, the structure is capable of preventing a phenomenon where the side sill is crumpled or crushed and is pushed into a passenger compartment. With the safety-enhanced center pillar structure, a space for passengers to survive may be secured, thereby reducing the risk of injury to a passenger.

In order to accomplish the above-mentioned object, according to an aspect of the present disclosure, a safety-enhanced center pillar structure for a vehicle is provided. The structure may include: a reinforced outer portion provided on the inner side of a center pillar of the vehicle; a reinforced inner portion provided on the inner side of the vehicle in a manner that is spaced apart from the reinforced outer portion; and a connection member positioned between the reinforced outer portion and the reinforced inner portion and connecting the reinforced outer portion and the reinforced inner portion to each other. One portion of the connection member may be positioned over an upper horizontal surface of a side sill outer portion of a side sill. Thus, the connection member may create a predetermined distance together with the upper horizontal surface of the side sill outer portion.

In the safety-enhanced center pillar structure, the connection member may form a closed cross section surrounded by or defined by the side outer reinforced outer portion, the reinforced inner portion, and the side sill outer portion.

In the safety-enhanced center pillar structure, the connection member may be formed in such a manner as to bend increasingly downward toward the outside of the vehicle. Also, upper and lower end portions of the connection member may be coupled to the reinforced inner portion and the reinforced outer portion, respectively.

In the safety-enhanced center pillar structure, the connection member may be joined, by welding, to surfaces, formed in a height direction of the vehicle, of the reinforced outer portion and the reinforced inner portion.

In the safety-enhanced center pillar structure, the connection member may include: an upper coupling portion coupled in the height direction of the vehicle to the reinforced inner portion; an extension portion extending inward in a widthwise direction of the vehicle from a lower end of the upper coupling portion; an intermediate coupling portion extending downward from an end of the extension portion and coupled to a side sill coupling portion of the reinforced inner portion; a connection portion extends inward in the widthwise direction of the vehicle from a lower end of the intermediate coupling portion and connecting the reinforced inner portion and the reinforced outer portion to each other; and a lower coupling portion extending in the height direction of the vehicle from an end of the connection portion and joined to the reinforced outer portion.

In the safety-enhanced center pillar structure, the connection member may be a seat belt retractor mounting bracket on which a retractor of a seat belt may be mounted.

In the safety-enhanced center pillar structure, the upper coupling portion may be coupled in the height direction of the vehicle to a seat belt retractor mounting portion of the reinforced inner portion.

In the safety-enhanced center pillar structure, the extension portion may be seated on a seating portion formed in a manner that extends in the widthwise direction of the vehicle from a lower end of the seat belt retractor mounting portion of the reinforced inner portion.

In the safety-enhanced center pillar structure, the extension portion may be seated over a seating portion formed in a manner that extends in the widthwise direction of the vehicle from a lower end of the seat belt retractor mounting portion of the reinforced inner portion.

In the safety-enhanced center pillar structure, a support bead may be formed on the intermediate coupling portion and the connection portion of the seat belt retractor mounting bracket in a manner that protrudes to a predetermined height along a lengthwise direction of the vehicle.

In the safety-enhanced center pillar structure, a gusset may be protrusively formed between the upper coupling portion and the extension portion of the seat belt retractor mounting bracket.

In the safety-enhanced center pillar structure, a gusset may be protrusively formed between the intermediate coupling portion and the connection portion of the seat belt retractor mounting bracket.

In the safety-enhanced center pillar structure, the connection member may include: an upper coupling portion coupled in the height direction of the vehicle to a seat belt retractor mounting portion of the reinforced inner portion; an extension portion extending inward in the widthwise direction of the vehicle from a lower end of the upper coupling portion and connected to the reinforced outer portion; an intermediate coupling portion extending downward from an end of the extension portion and joined to the reinforced inner portion; a connection portion extending inward in the widthwise direction of the vehicle from a lower end of the intermediate coupling portion and connecting the reinforced outer portion and a side sill coupling portion, forming a lower portion of the reinforced inner portion, to each other; and a lower coupling portion extending in the height direction of the vehicle from an end of the connection portion and coupled to a coupling surface of the side sill. The connection portion may be positioned over an upper horizontal surface of the side sill outer portion and the extension portion may be positioned over the connection portion.

In the safety-enhanced center pillar structure, the connection member may be a seat belt retractor mounting bracket on which a retractor of a seat belt may be mounted.

In the safety-enhanced center pillar structure, a support bead may be formed on the intermediate coupling portion and the connection portion of the seat belt retractor mounting bracket in a manner that protrudes to a predetermined height along the lengthwise direction of the vehicle.

In the safety-enhanced center pillar structure, a gusset may be protrusively formed between the upper coupling portion and the extension portion of the seat belt retractor mounting bracket.

In the safety-enhanced center pillar structure for a vehicle according to the present disclosure, which employs the configuration described herein, the seat belt retractor mounting bracket may form the closed cross section together with the reinforced outer portion, the reinforced inner portion, and the side sill outer portion. Thus, a phenomenon where connected portions of the center pillar and the side sill are crumpled or crushed in a collision may be prevented, thereby preventing a cross section of the side sill from collapsing.

Accordingly, a phenomenon where the side sill is rotated and is pushed into the inside of the vehicle may be prevented, thereby enhancing the safety of the passenger.

DESCRIPTION OF SPECIFIC EMBODIMENTS

Figure 1:
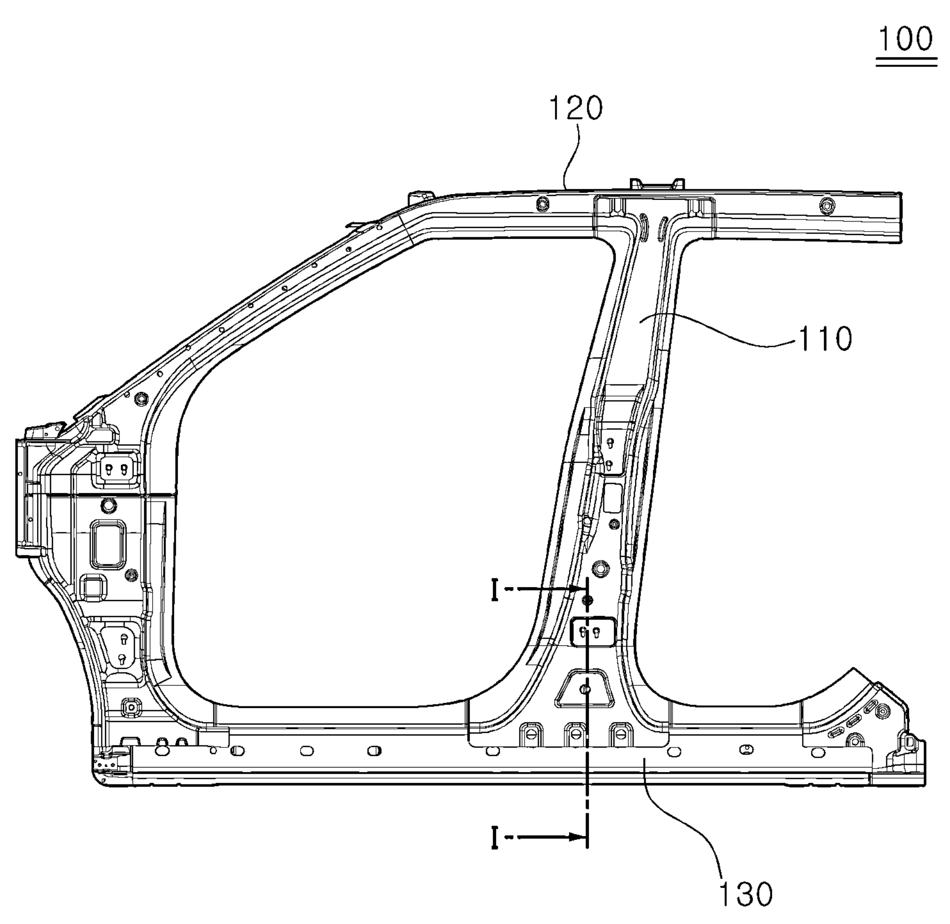
FIG. 1 is a side view illustrating a known lateral structure of a vehicle.
Figure 2:
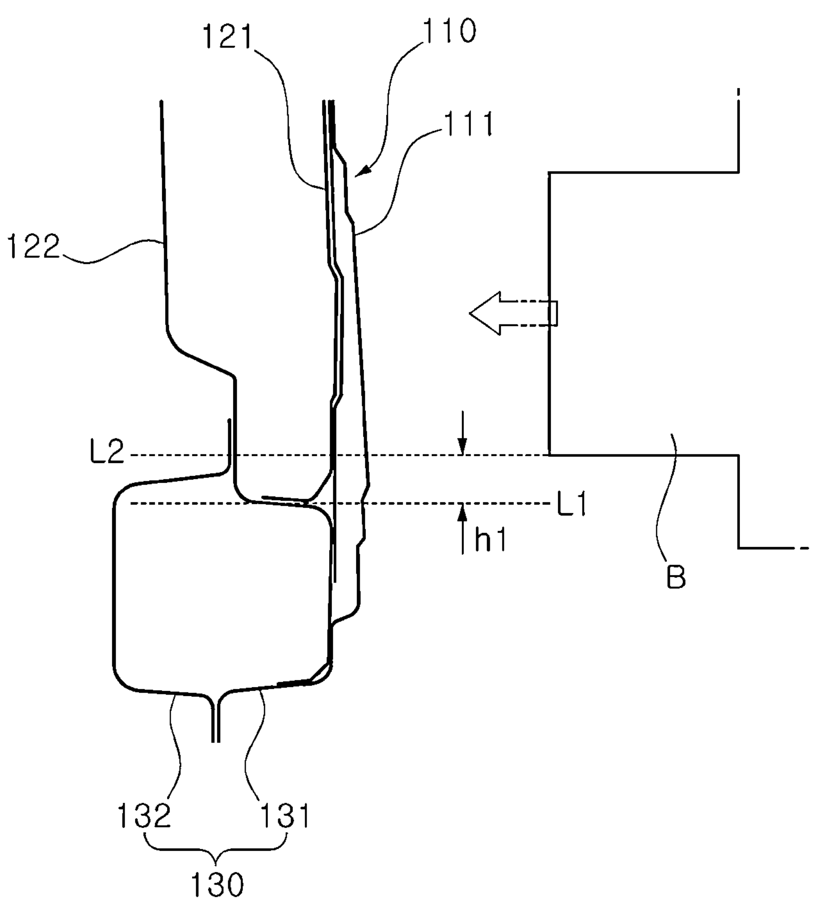
FIG. 2 is a cross-sectional view taken along line I-I the lateral structure of FIG. 1.
Figure 3:
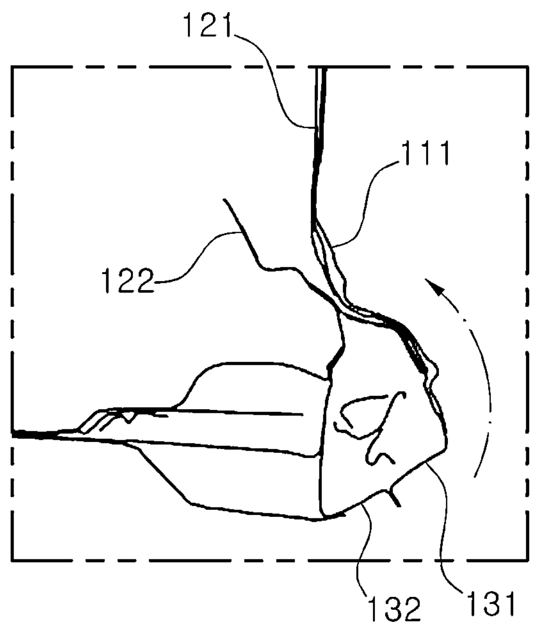
FIG. 3 is a cross-sectional view illustrating a state where a side sill of the lateral structure of FIG. 2 is crumpled or crushed during a lateral collision.

A safety-enhanced center pillar structure of a vehicle according to the present disclosure will be described in detail below with reference to the accompanying drawings. When a component, device, element, or the like of the present disclosure is described as having a purpose or performing an operation, function, or the like, the component, device, or element should be considered herein as being "configured to" meet that purpose or perform that operation or function. Further, the terms "reinforced" and "reinforcing" as used herein may be interchangeable to mean that an element is reinforced or that the element reinforces another element. Also, the term "portion" may be used herein to define a part, panel, segment, section, wall, or the like of any portion of the vehicle body, side sill, or center pillar structures. Thus, a noted portion may instead be termed a part, panel, segment, section, wall, or the like as appropriate.

The safety-enhanced center pillar structure for a vehicle according to the present disclosure may include a reinforced outer portion 21 provided on the inner side of a center pillar outer 11 of the vehicle. The structure also includes a reinforced inner portion 22 provided on the inner side of the vehicle in a manner that is spaced apart from the reinforced outer portion 21. The structure also includes a connection member 40 positioned between the reinforced outer portion 21 and the reinforced inner portion 22 and connecting the reinforced outer portion 21 and the reinforced inner portion 22 to each other. One portion of the connection member 40 is positioned over an upper horizontal surface 31*a* of a side sill outer portion 31. Thus, the connection member 40 forms a gap of a predetermined distance 'c' together with the upper horizontal surface 31*a* of the side sill outer portion 31.

A center pillar 10 may connect a roof 120 of the vehicle and a side sill 30 to each other. In the center pillar 10, a center pillar outer portion 11 and a center pillar inner portion may be provided in such a manner as to connect the roof of the vehicle and the side sill 30. The reinforced outer portion 21 and the reinforced inner portion 22 are for reinforcing the stiffness of the center pillar 10 and may be provided between the center pillar outer portion 11 and the center pillar inner portion.

The reinforced outer portion 21 and the reinforced inner portion 22 may be arranged on the inner side of the center pillar outer 11 and on the inner side of the vehicle, respectively, thereby reinforcing the stiffness of the center pillar 10.

The reinforced inner portion 22 may include a seat belt retractor mounting portion 22*a*, a seating portion 22*b*, and a side sill coupling portion 22*c*. The seat belt retractor mounting portion 22*a* on which a seat belt retractor is mounted may be formed to extend in the height direction of the vehicle. The seating portion 22*b* may be formed in a manner that extends at least partly or entirely outward in the widthwise direction of the vehicle from a lower end of the seat belt retractor mounting portion 22*a*. The side sill coupling portion 22*c* may be formed to extend at least partly or entirely downward from an end of the seating portion 22*b* and to be joined to the side sill 30.

Figure 7:
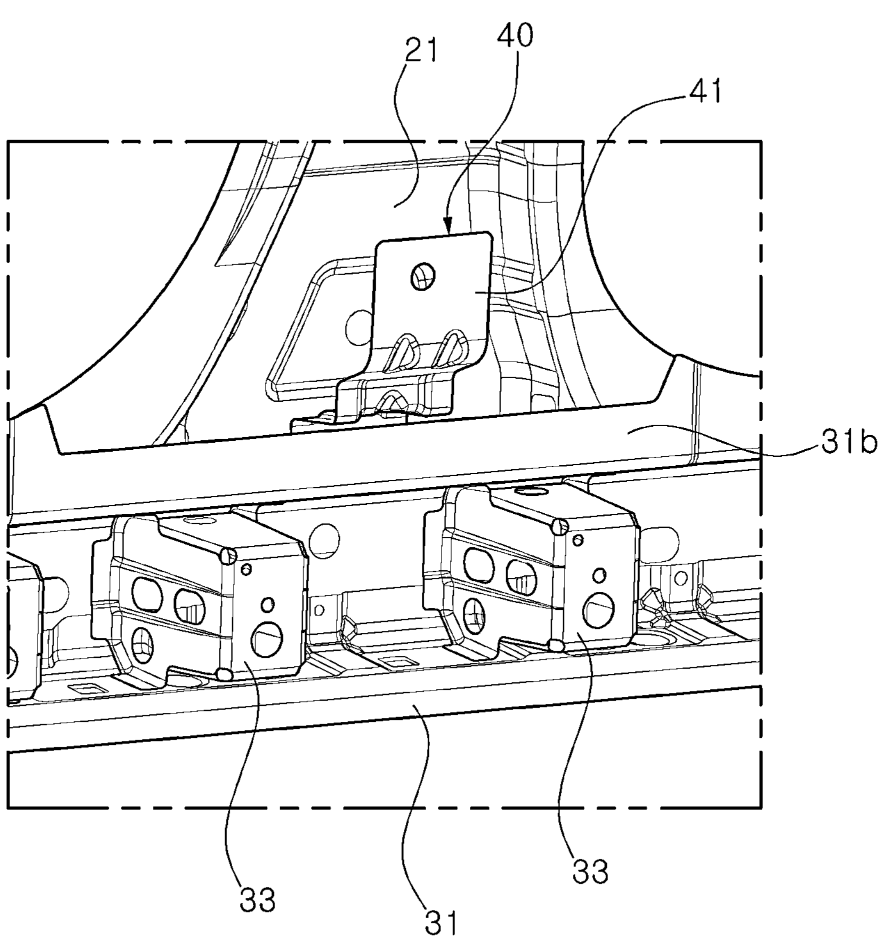
FIG. 7 is a perspective view illustrating a state where the seat belt retractor mounting bracket of FIG. 6 is pre-fastened to a reinforced outer portion in a safety-enhanced center pillar structure of a vehicle according to the present disclosure.

The side sill 30 may include the side sill outer portion 31 and a side sill inner portion 32. The side sill outer portion 31 has a cross section that may be convex toward the outside of the vehicle. The side sill inner 32 may have a cross section that is convex toward the inside of the vehicle. Upper end portions of the side sill outer portion 31 and the side sill inner portion 32 may be connected to each other. Also, lower end portions of the respective side sill outer portion 31 and side sill inner portion 32 may be connected to each other. These connections may form the side sill 30 as having a hollow closed cross section, thereby forming the structure of an end portion of a lateral surface or side of the vehicle. A reinforcement member 33 may be further provided between the side sill outer portion 31 and the side sill inner portion 32. The reinforcement member 33 may cause the side sill outer portion 31 and the side sill inner portion 32 to support each other, i.e., the member 33 may provide support therebetween. Multiple reinforcement members 33 may be provided, as depicted in FIG. 7.

The reinforced outer portion 21 and the reinforced inner portion 22 may be connected to the side sill 30, thereby reinforcing the stiffness of a center pillar 10. For example, the reinforced outer portion 21 may be coupled to an outer surface of the side sill outer portion 31, and the reinforced inner portion 22 may be coupled to the upper horizontal surface 31*a* of the side sill outer portion 31.

Particularly, according to the present disclosure, the connection member 40 may be provided to connect the reinforced outer portion 21 and the reinforced inner portion 22 to each other.

Figure 4:
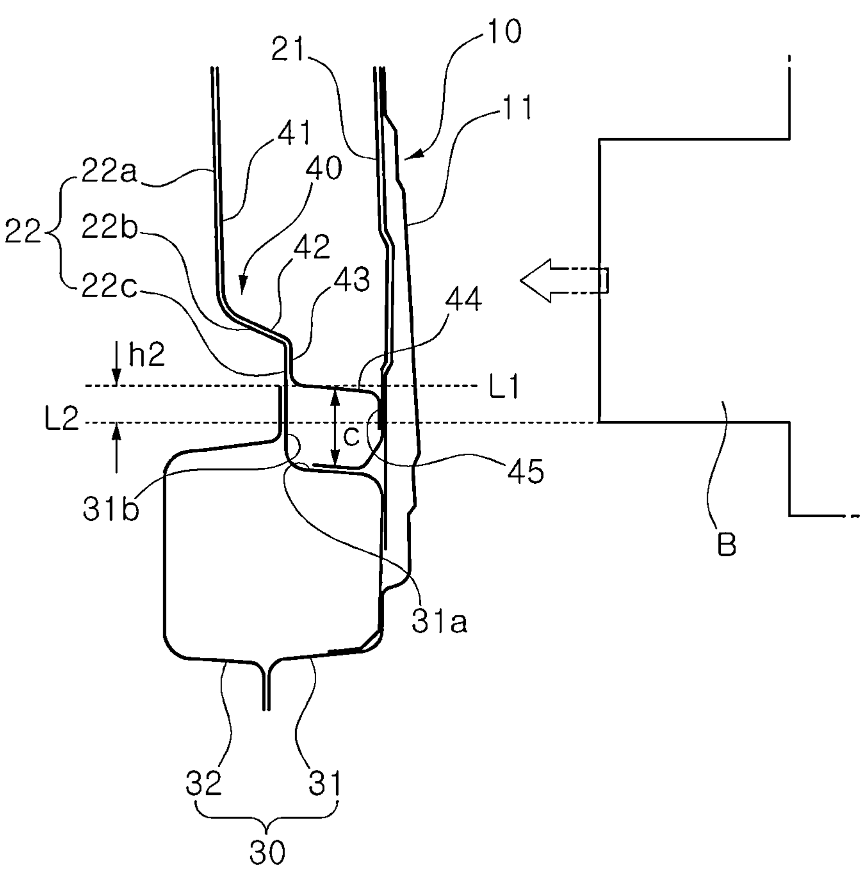
FIG. 4 is a cross-sectional view illustrating a safety-enhanced center pillar structure of a vehicle according to the present disclosure.
Figure 5:
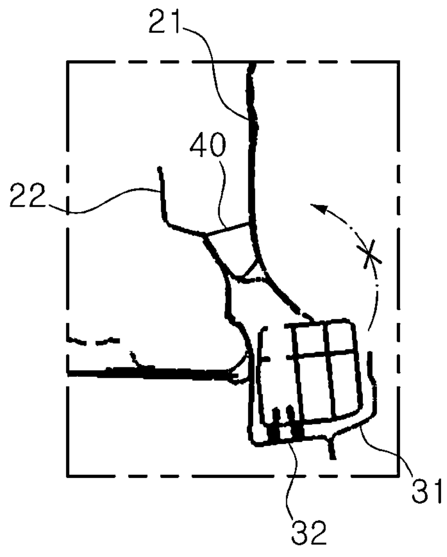
FIG. 5 is a cross-sectional view illustrating a state of the safety-enhanced center pillar structure of FIG. 4 that appears during a lateral collision.

The connection member 40 may be arranged a predetermined distance 'c' apart from the upper horizontal surface 31*a* of the side sill outer portion 31, as shown in FIG. 4.

One side and the other side of the connection member 40 may be coupled to the reinforced outer portion 21 and the reinforced inner portion 22, respectively, in such a manner that one portion of the connection member 40 creates the predetermined distance 'c' together with the upper horizontal surface 31*a* of the side sill outer portion 31.

Accordingly, one portion of the connection member 40 may be positioned over the upper horizontal surface 31*a* of the side sill outer portion 31. With this positioning, the connection member 40 creates the predetermined distance 'c' together with the upper horizontal surface 31*a* of the side sill outer portion 31. As a result, a closed cross section may be additionally formed over the side sill 30.

With the positioning of one portion of the connection member 40 over the side sill outer 31, the connection member 40 may form the closed cross section together with the reinforced outer portion 21, the reinforced inner portion 22, and the side sill outer portion 31. The addition of the closed cross section on connected portions of the center pillar 10 and the side sill 30 may increase the stiffness of the connected portions of the center pillar 10 and the side sill 30, thereby enhancing stability during a lateral collision.

The connection member 40 may be formed in such a manner as to be overall bent increasingly downward toward the outside of the vehicle. An upper end portion 41 of the connection member 40 may be fastened to the reinforced inner portion 22, and a lower end portion 45 thereof may be coupled to the reinforced outer portion 21.

The connection member 40 may be coupled, by welding, to the reinforced outer portion 21 and the reinforced inner portion 22. In this case, it may be advantageous that the connection member 40 is coupled, by welding, to surfaces, formed in the height direction of the vehicle, of the reinforced outer portion 21 and the reinforced inner portion 22, i.e., to surfaces, vertical to the widthwise direction of the vehicle, of the reinforced outer portion 21 and the reinforced inner portion 22.

At this point, the connection member 40 may be a seat belt retractor mounting bracket 40 on which a retractor of a seat belt in the first row of the vehicle is mounted. The seat belt retractor mounting bracket 40 for mounting the retractor may be provided and connected to the center pillar 10. With the seat belt retractor mounting bracket 40, the reinforced outer portion 21 and the reinforced inner portion 22 may be connected to each other, thereby increasing the stiffness of the connected portions of the center pillar and the side sill 30.

Figure 6:
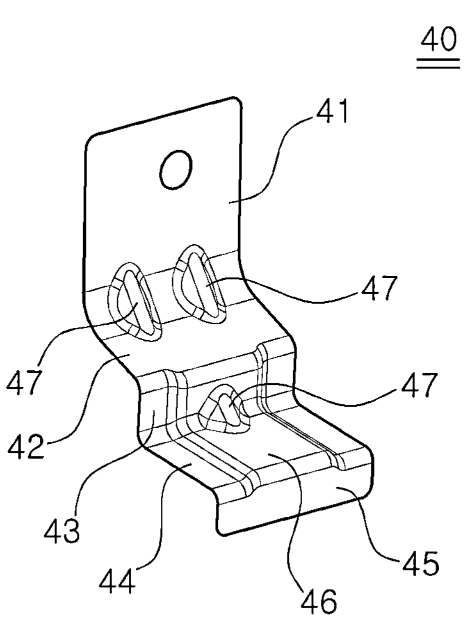
FIG. 6 is a perspective view illustrating a seat belt retractor mounting bracket that is used in a safety-enhanced center pillar structure of a vehicle according to the present disclosure.

FIG. 6 is a perspective view illustrating the seat belt retractor mounting bracket 40.

The seat belt retractor mounting bracket 40 may be formed in such a manner that multiple portions thereof are bent in a stepwise manner in the height direction of the vehicle, thereby having a multi-stepped structure. As an example, the seat belt retractor mounting bracket 40 may be formed to employ a multi-stepped structure in which the height thereof increases from the outside of the vehicle toward the inside of the vehicle.

In one embodiment, and in more detail, the seat belt retractor mounting bracket may include an upper coupling portion 41 coupled in the height direction of the vehicle to the seat belt retractor mounting portion 22*a* of the reinforced inner portion 22. The mounting bracket 40 may also have an extension portion 42 extending at least partly, if not entirely, outward in the widthwise direction of the vehicle from a lower end of the upper coupling portion 41. The mounting bracket 40 may also have an intermediate coupling portion 43 extending at least partly, if not entirely, downward from an end portion of extension portion 42 and coupled to the side sill coupling portion 22*c* of the reinforced inner portion 22 of the side sill structure. The mounting bracket may also have a connection portion 44 extending at least pertly, if not entirely, outward in the widthwise direction of the vehicle from a lower end of the intermediate coupling portion 43 and connecting the reinforced inner portion 22 and the reinforced outer portion 21 to each other. The mounting bracket 40 may also have a lower coupling portion 45 extending at least partly, if not entirely, downward from an end of the connection portion 44 and joined to the reinforced outer portion 21 of the center pillar structure.

In this case, the connection portion 44 may be positioned over the upper horizontal surface 31*a* of the side sill outer portion 31 in a manner so that the connecting portion 44 is spaced apart therefrom. As a result, a closed cross section may be additionally formed over the side sill 30, thereby improving the performance in shock absorption against a lateral collision.

The extension portion 42 may be seated on the seating portion 22*b* formed in a manner that extends in the widthwise direction of the vehicle from the lower end of the seat belt retractor mounting portion 22*a* of the reinforced inner portion 22.

A support bead 46 may be formed on the seat belt retractor mounting bracket 40. The support bead 46 may be formed on the seat belt retractor mounting bracket 40 in a manner that protrudes to a predetermined height along a lengthwise direction of the vehicle. In other words, the support bead 46 may be formed on the intermediate coupling portion 43 and the connection portion 44 of the seat belt retractor mounting bracket 40 in a manner that protrudes to a predetermined height along the lengthwise direction of the vehicle. The support bead 46 formed on the seat belt retractor mounting bracket 40 may support a collision load F that is applied from the lateral surface of the vehicle during the lateral collision. Thus, the stiffness is thereby enhanced in the widthwise direction of the vehicle of the seat belt retractor mounting bracket 40.

In addition, a gusset 47 may be formed on the seat belt retractor mounting bracket 40. The gusset 47 may be formed on a portion of the seat belt retractor mounting bracket where the lower end of a surface running along the height direction of the vehicle is continuous with a surface in parallel to the ground or extending in a width direction of the vehicle. In other words, the gusset 47 may be protrusively formed between the upper coupling portion 41 and the extension portion 42 of the seat belt retractor mounting bracket 40 or may be protrusively formed between the intermediate coupling portion 43 and the connection portion 44 thereof. The gusset 47 may prevent a phenomenon where the seat belt retractor mounting bracket 40 is bent or deformed to the outside of the vehicle. One or more gussets 47 may be provided at each bend to strengthen the mounting bracket 40.

The seat belt retractor mounting bracket 40 may be formed to employ a multi-stepped structure. A surface, formed in the height direction of the vehicle, of the seat belt retractor mounting bracket 40 may be used to couple the seat belt retractor mounting bracket 40 to the reinforced outer portion 21 or the reinforced inner portion 22.

For example, the upper coupling portion 41 and the intermediate coupling portion 43 of the seat belt retractor mounting bracket 40 may be used to couple, by welding, the seat belt retractor mounting bracket 40 to the reinforced inner portion 22. Also, the lower coupling portion 45 thereof may be used to couple, by welding, the seat belt retractor mounting bracket 40 to the reinforced outer portion 21.

Figure 8:
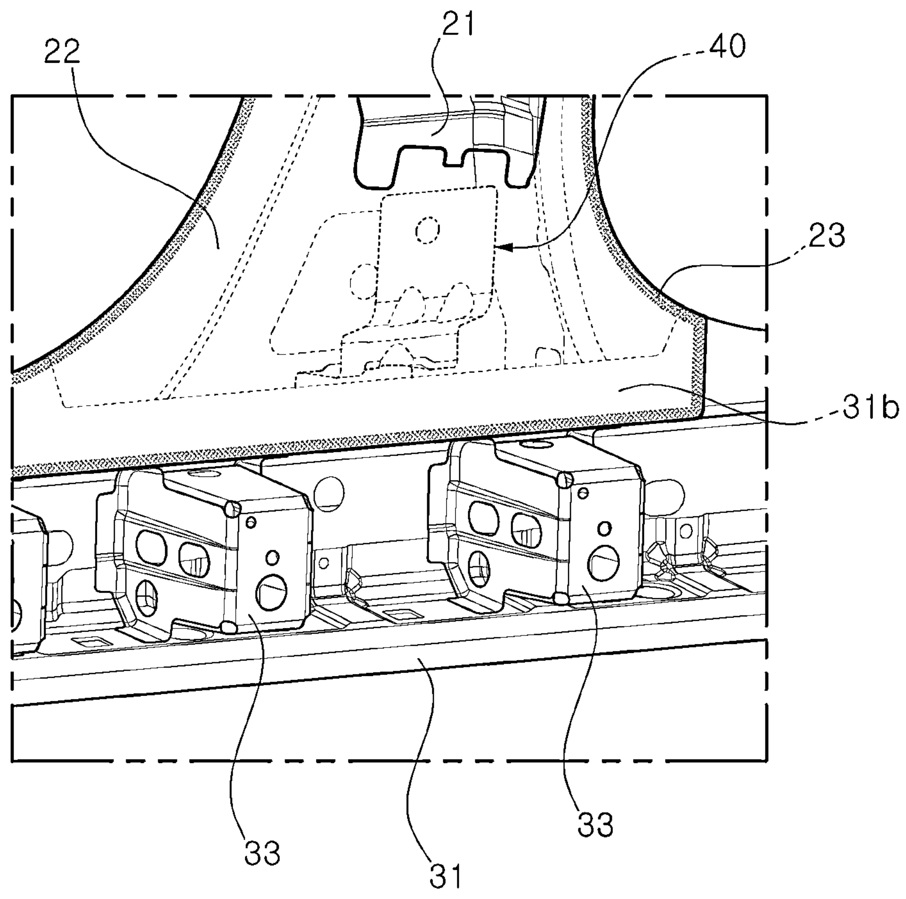
FIG. 8 is a three-dimensional perspective view illustrating a state where a reinforced inner portion is fastened in a safety-enhanced center pillar structure of a vehicle according to the present disclosure.
Figure 9:
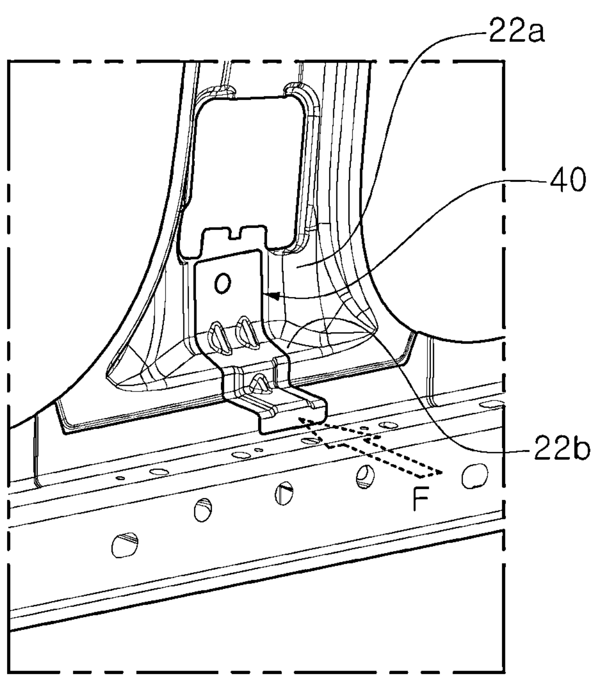
FIG. 9 is a three-dimensional perspective view illustrating a state where a seat belt retractor mounting bracket is assembled in a safety-enhanced center pillar structure of a vehicle according to the present disclosure.

In this case, as illustrated in FIG. 7, the lower coupling portion 45 of the seat belt retractor mounting bracket 40 may be first coupled to the reinforced outer portion 21. Subsequently, as illustrated in FIG. 8, when the reinforced inner portion 22 is coupled to the reinforced outer portion 21, the upper coupling portion 41 and the intermediate coupling portion 43 of the seat belt retractor mounting bracket 40 may be also coupled to the reinforced inner portion 22. When the reinforced inner portion 22 is coupled to the reinforced outer portion 21, an edge thereof may be coupled using a structural adhesive 23.

The connection portion 44, which is one portion of the surface, extending generally horizontally or formed in parallel to the ground, of the seat belt retractor mounting bracket 40, may be positioned at a distance from the side sill outer portion 31, resulting in additionally forming a closed cross section over the side sill 30.

In the safety-enhanced center pillar structure of a vehicle according to the present disclosure, as described above, the seat belt retractor mounting bracket 40 may form the closed cross section that is surrounded by or defined by the reinforced outer portion 21, the reinforced inner portion 22, and the side sill outer portion 31.

A height of the closed cross section formed in this manner may support, i.e., resist, the collision load F applied to the lateral surface of the vehicle. This height increases during the lateral collision, thereby enhancing the stability.

For example, an upper horizontal surface of the closed cross section, i.e., the connection portion 44, may be positioned at a greater height than a lower end of a barrier B (see FIG. 4) that hits the vehicle during a lateral collision experiment. In other words, with reference to FIG. 4, the upper horizontal surface (L1) of the closed cross section formed by the seat belt retractor mounting bracket 40 may be positioned at a higher position by a height h2 than a lower end portion (L2) of the barrier B. Accordingly, although the collision load F is applied to the lateral surface of the vehicle during the lateral collision, the side sill outer portion 31 and the side sill inner portion 32 that constitute the side sill 30 may maintain the cross-section shape and thus may support or resist the collision load F. Moreover, connected portions of the center pillar 10 and the side sill outer portion 31 may be crumpled or crushed, and thus a phenomenon where the side sill 30 is rotated may be prevented.

Accordingly, a space necessary for passengers to survive may be sufficiently secured within a passenger compartment of the vehicle, thereby enhancing the safety of a passenger in the vehicle during the lateral collision.

Figure 10:
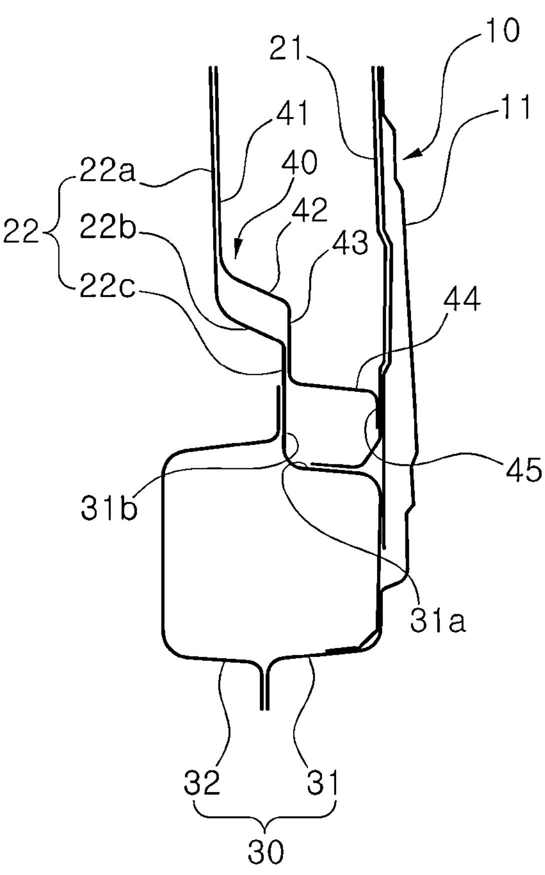
FIGS. 10-12 are respective cross-sectional views, each illustrating a safety-enhanced center pillar structure of a vehicle according to other embodiments of the present disclosure.
Figure 11:
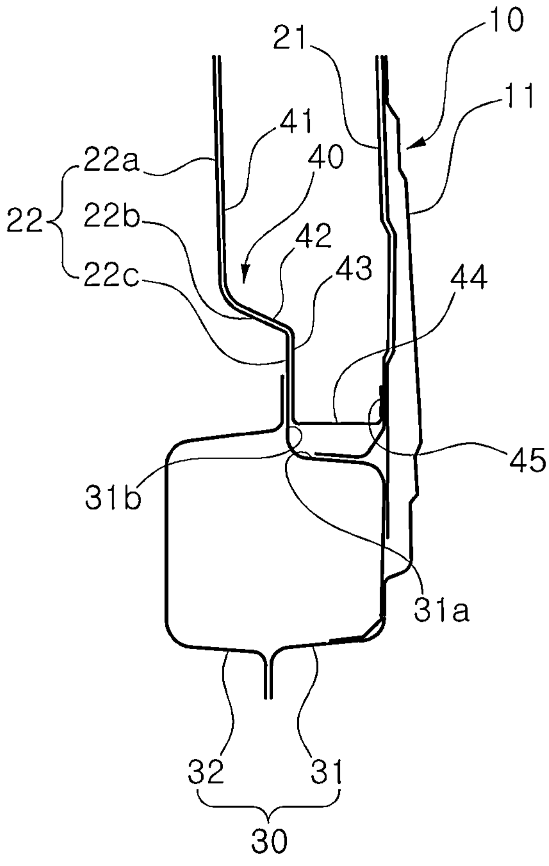
Figure 12:
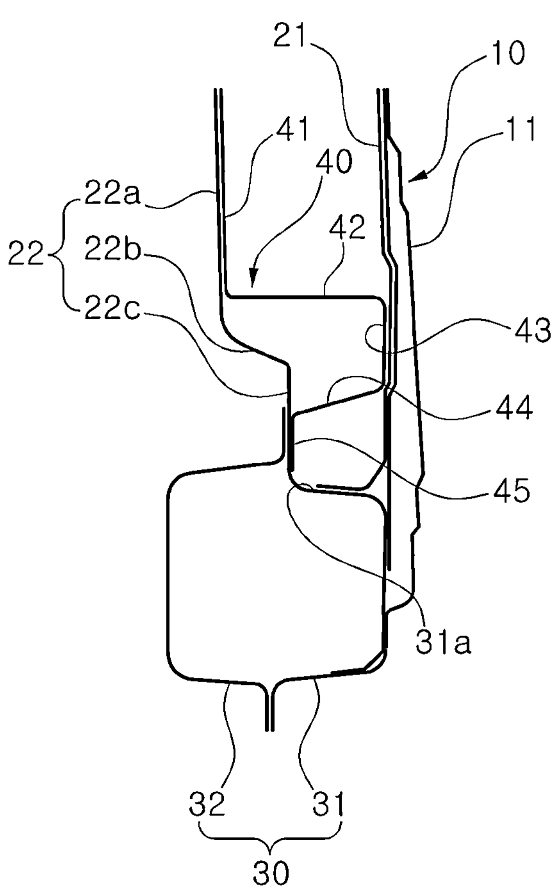

FIGS. 10-12 are views each illustrating a safety-enhanced center pillar structure of a vehicle according to other embodiments of the present disclosure.

In FIGS. 10-12, a modified shape of the connection member, i.e., the seat belt retractor mounting bracket 40 is illustrated. Constituent elements other than the seat belt retractor mounting bracket 40 may be formed in the same manner as in the embodiment described above.

In each of the embodiments, the seat belt retractor mounting bracket 40 may be formed in a bent shape along the height direction of the vehicle. The surface, formed in the height direction of the vehicle, of the seat belt retractor mounting bracket 40 may be coupled to the reinforced outer portion 21 or the reinforced inner portion 22. One portion of the generally horizontal surface or in parallel to the ground may be positioned at a distance from the upper horizontal surface 31*a* of the side sill outer portion 31.

In the embodiment illustrated in FIG. 10, the extension portion 42 of the seat belt retractor mounting bracket 40 may be formed in such a manner as to be positioned over the seating portion 22*b* of the reinforced inner portion 22. The seating portion 22*b* may be formed in a manner that extends in the widthwise direction of the vehicle from the lower end of the seat belt retractor mounting portion 22*a* of the reinforced inner portion 22. The extension portion 42 may be positioned over the seating portion 22*b*. A closed cross section may be also additionally formed between the extension portion 42 and the seating portion 22*b*. Thus, the collision load F due to the lateral collision may be additionally supported during the lateral collision.

FIG. 11 is a view illustrating an example where the lower coupling portion 45 forming a lower end portion of the seat belt retractor mounting bracket 40 is bent upward. In this case, the extension portion 42 and the upper horizontal surface 31*a* of the side sill outer portion 31 may be spaced away from each other. Thus, the collision load F can be supported during the lateral collision.

FIG. 12 is a view illustrating an example where the seat belt retractor mounting bracket 40 is formed in a zigzag fashion, i.e., has a zig zag shape. In other words, the seat belt retractor mounting bracket 40 formed in a zigzag fashion may include the upper coupling portion 41 coupled in the height direction of the vehicle to the seat belt retractor mounting portion 22*a* of the reinforced inner portion 22. The mounting bracket 40 may also include the extension portion 42 extending outward in the widthwise direction of the vehicle from the lower end of the upper coupling portion 41 and connected to the reinforced outer portion 21. The mounting bracket 40 may also include the intermediate coupling portion 43 extending downward from the end of the extension portion 42 and joined to the reinforced inner portion 22. The mounting bracket 40 may also include the connection portion 44 extending inward in the widthwise direction of the vehicle from the lower end of the intermediate coupling portion 43 and connecting the reinforced outer portion 21 and the side sill coupling portion 22*c*, forming a lower portion of the reinforced inner portion 22, to each other. The mounting bracket 40 may also include the lower coupling portion 45 extending in the height direction of the vehicle from the end of the connection portion 44 and coupled to a coupling surface 31*b*, to which the side sill inner 32 is coupled, of the side sill outer portion 31 of the side sill 30.

The connection portion 44 may be positioned over the upper horizontal surface 31*a* of the side sill outer portion 31, thereby additionally forming a closed cross section over the side sill 30. In this case, the extension portion 42 may be positioned over the connection portion 44, thereby additionally forming a closed cross section.

FIG. 12 is a view illustrating the support bead 46 and the gusset 47 of a safety-enhanced center pillar structure of a vehicle according to one other embodiment of the present disclosure. In other words, the support bead 46 may be formed on the intermediate coupling portion 43 and the connection portion 44 in a manner that protrudes to a predetermined height along the lengthwise direction of the vehicle. The gusset 47 may be protrusively formed between the upper coupling portion 41 and the extension portion 42.

In the embodiments illustrated in FIGS. 10-12, the seat belt retractor mounting bracket 40 may be also formed in a bent manner along the height direction of the vehicle and may connect the reinforced outer portion 21 and the reinforced inner portion 22 to each other. Accordingly, a closed cross section that supports connected portions of the center pillar 10 and the side sill 30 may be additionally formed by the seat belt retractor mounting bracket 40, the reinforced outer portion 21, the reinforced inner portion 22, and the side sill outer portion 31.

While several embodiments of the present disclosure have been described with reference to the accompanying drawings, those of ordinary skill in the art should understand that the present disclosure may be carried out in various other specific forms without departing from the inventive concept of the present disclosure and without changing the technical spirit or an essential feature of the present disclosure. Therefore, it should be understood that the above-described embodiments are illustrative in all aspects and do not limit the present disclosure.

What is claimed is:

1. A safety-enhanced center pillar structure for a vehicle, the center pillar structure comprising:
- a center pillar of the vehicle;
- a reinforced outer portion on an inner side of the center pillar;
- a reinforced inner portion on an inner side of the vehicle, the reinforced inner portion spaced apart from the reinforced outer portion; and
- a connection member positioned between the reinforced outer portion and the reinforced inner portion and connecting the reinforced outer portion and the reinforced inner portion to each other,
- wherein one portion of the connection member is positioned over an upper horizontal surface of a side sill outer portion of a side sill, and
- wherein the connection member creates a predetermined distance together with the upper horizontal surface of the side sill outer portion.

2. The center pillar structure of claim 1, wherein the connection member forms a closed cross section surrounded by the reinforced outer portion, the reinforced inner portion, and the side sill outer portion.

3. The center pillar structure of claim 1, wherein the connection member is bent increasingly downward in a direction toward an outside of the vehicle, and wherein upper and lower end portions of the connection member are coupled to the reinforced inner portion and the reinforced outer portion, respectively.

4. The center pillar structure of claim 1, wherein the connection member is coupled, by welding, to surfaces, formed in a height direction of the vehicle, of the reinforced outer portion and the reinforced inner portion.

5. The center pillar structure of claim 1, the connection member comprises:
- an upper coupling portion coupled in a height direction of the vehicle to the reinforced inner portion;
- an extension portion extending outward in a widthwise direction of the vehicle from a lower end of the upper coupling portion;
- an intermediate coupling portion extending downward from an end of the extension portion and coupled to a side sill coupling portion of the reinforced inner portion;
- a connection portion extending outward in the widthwise direction of the vehicle from a lower end of the intermediate coupling portion and connecting the reinforced inner portion and the reinforced outer portion to each other; and
- a lower coupling portion extending in the height direction of the vehicle from an end of the connection portion and joined to the reinforced outer portion.

6. The center pillar structure of claim 5, wherein the connection member is a seat belt retractor mounting bracket configured for a retractor of a seat belt to be mounted thereto.

7. The center pillar structure of claim 6, wherein the upper coupling portion is coupled in the height direction of the vehicle to a seat belt retractor mounting portion of the reinforced inner portion.

8. The center pillar structure of claim 6, wherein the connection portion is positioned over the upper horizontal surface of the side sill outer portion and spaced apart therefrom.

9. The center pillar structure of claim 7, wherein the extension portion is seated on a seating portion that extends in the widthwise direction of the vehicle from a lower end of the seat belt retractor mounting portion of the reinforced inner portion.

10. The center pillar structure of claim 7, wherein the extension portion and the seating portion form a closed cross section therebetween.

11. The center pillar structure of claim 6, wherein a support bead is formed on the intermediate coupling portion and the connection portion of the seat belt retractor mounting bracket in a manner that protrudes to a predetermined height along the lengthwise direction of the vehicle.

12. The center pillar structure of claim 6, wherein a gusset is protrusively formed between the upper coupling portion and the extension portion of the seat belt retractor mounting bracket.

13. The center pillar structure of claim 6, wherein a gusset is protrusively formed between the intermediate coupling portion and the connection portion of the seat belt retractor mounting bracket.

14. The center pillar structure of claim 1, wherein the connection member comprises:

an upper coupling portion coupled in a height direction of the vehicle to a seat belt retractor mounting portion of the reinforced inner portion;

an extension portion extending outward in a widthwise direction of the vehicle from a lower end of the upper coupling portion and connected to the reinforced outer portion;

an intermediate coupling portion extending downward from an end of the extension portion and joined to the reinforced inner portion;

a connection portion extending inward in the widthwise direction of the vehicle from a lower end of the intermediate coupling portion and connecting the reinforced outer portion and a side sill coupling portion, which forms a lower portion of the reinforced inner portion, to each other; and a lower coupling portion extending in the height direction of the vehicle from an end of the connection portion and coupled to a coupling surface of the side sill, wherein the connection portion is positioned over an upper horizontal surface of the side sill outer portion and the extension portion is positioned over the connection portion.

15. The center pillar structure of claim 14, wherein the connection member is a seat belt retractor mounting bracket configured to a retractor of a seat belt to be mounted thereto.

16. The center pillar structure of claim 15, wherein a support bead is formed on the intermediate coupling portion and the connection portion of the seat belt retractor mounting bracket in a manner that protrudes to a predetermined height along the lengthwise direction of the vehicle.

17. The center pillar structure of claim 15, wherein a gusset is protrusively formed between the upper coupling portion and the extension portion of the seat belt retractor mounting bracket.

18. The center pillar structure of claim 15, wherein the seat belt retractor mounting bracket employs a multi-stepped structure where multiple portions thereof are bent in a stepwise manner in the height direction of the vehicle.

19. The center pillar structure of claim 15, wherein the lower coupling portion forming a lower end portion of the seat belt retractor mounting bracket is bent upward where the extension portion and the upper horizontal surface of the side sill outer portion are spaced apart from each other.

20. The center pillar structure of claim 15, wherein the seat belt retractor mounting bracket has a zigzag shape.

* * * * *